United States Patent [19]
Hall

[11] 3,812,213

[45] May 21, 1974

[54] PREPARATION OF DIALKYL BERYLLIUM AND RECOVERY BY DISTILLATION

[75] Inventor: Crayton G. Hall, Baton Rouge, La.

[73] Assignee: Ethyl Corporation, New York, N.Y.

[22] Filed: Sept. 27, 1963

[21] Appl. No.: 312,835

[52] U.S. Cl. .............................. 260/665 R, 204/73
[51] Int. Cl. ............................................. C07f 3/00
[58] Field of Search ............................... 260/665 R

[56] References Cited
OTHER PUBLICATIONS

Coates et al., J. Chem. Soc., (London), pp. 22–24 (1954) QD1C6.

Primary Examiner—Leland A. Sebastian
Attorney, Agent, or Firm—Donald L. Johnson; John F. Sieberth; Lewis Hess

EXEMPLARY CLAIM

1. In the process for preparing a dialkylberyllium compound which comprises reacting an anhydrous beryllium halide wherein the halogen has an atomic number of from 17 to 53, inclusive, with an alkyl magnesium halide wherein the halogen has an atomic number of from 17 to 53, inclusive, and wherein the alkyl group contains from three to eight carbon atoms, in a solvent comprising an ether selected from the group consisting of aliphatic, alicyclic and heterocyclic ethers containing up to six carbon atoms in each hydrocarbon group, and separating the dialkylberyllium product from the crude reaction product, the improvement which comprises carrying out the separation step by diluting said reaction product with a hydrocarbon chaser having an initial boiling point in the range of 250° to 300°C. and a final boiling point in the range of 350° to 450°C., distilling off essentially all of the uncomplexed ether, and then distilling the dialkylberyllium product under reduced pressure, the quantity of said hydrocarbon chaser being sufficient to maintain in suspension the solid residue from the distillation of the said dialkylberyllium product.

11 Claims, No Drawings

PREPARATION OF DIALKYL BERYLLIUM AND RECOVERY BY DISTILLATION

This invention relates to a new and useful process for the preparation of organoberyllium compounds and more particularly to a new and improved method for the recovery of organoberyllium compounds from the reaction mixture resulting from the reaction of a beryllium halide with a Grignard reagent.

The method of preparing dialkylberyllium compounds by the reaction of an alkyl magnesium halide with a beryllium halide is well known. However, the separation of the dialkylberyllium product from the reaction mixture has been a matter of exceeding difficulty and has resulted, in general, in highly impure products.

The process hitherto used for the recovery of the dialkylberyllium product from the Grignard-beryllium halide reaction mixture involves the steps of filtering to separate the insoluble magnesium chloride from the reaction mixture (magnesium bromide and iodide are relatively soluble in the reaction mixture and consequently this process is limited to the use of chloride reactants), distilling the filtrate to dryness in the pot, thereby partially decomposing the etherate to the ether-free dialkylberyllium, and washing out the still residues with a suitable solvent.

In such a process filtration is slow under the best conditions and is impossible when conditions are unfavorable as, for instance, when gel formation occurs. The crystal size of the solid phase is subject to a high degree of variation, and the large crystals sometimes formed are often accompanied by crystals so small as to clog the filter element. Moreover, it is necessary to wash the filter cake (largely magnesium chloride) to remove and recover as much as possible of the residual beryllium alkyl etherate. This operation is tedious and only partially successful, owing to channelling of the filter cake and resultant hold-up of the alkyl etherate. This leads not only to a greatly reduced product yield but to mechanical difficulty in removing the filter cake from the filter in such manner as to avoid air exposure and attendant spontaneous inflammation of the beryllium alkyl.

Accordingly, it is an object of the present invention to provide a novel and efficient method for the separation of dialkylberyllium compounds from the other products of the alkyl magnesium halide-beryllium halide reaction. Another object is to provide a novel method for the separation of ether-free dialkylberyllium products in high yield and purity. Still another object is to provide a method for the separation or isolation of dialkylberyllium compounds which is not subject to the objections and disadvantages of the former method. Other objects will appear hereinafter.

It has now been found that the above and other objects of the present invention can be accomplished by carrying out the separation step by diluting the reaction products with a hydrocarbon chaser having an initial boiling point of 250° to 350°C., distilling off essentially all the uncomplexed ether, distilling off the dialkylberyllium under atmospheric or reduced pressure or both, and collecting the said dialkylberyllium, the quantity of the hydrocarbon chaser being sufficient to maintain in suspension the solid residue from the distillation of the dialkylberyllium.

In more specific terms, the process of the present invention involves the steps of transferring the dialkylberyllium etherate reaction mixture to a still, adding a high-boiling chaser, removing the bulk of the ether solvent at atmospheric or moderately reduced pressure, removing the residual ether by distillation under further reduced pressure, reducing the pressure still further to distill off the desired dialkylberyllium product, and discharging the solids, suspended in the chaser, from the still. In a particular embodiment of this invention, the dialkylberyllium etherate reaction mixture obtained by the reaction of an alkyl magnesium chloride with anhydrous beryllium chloride, both in ether solution, is suspended in a high-boiling hydrocarbon chaser and the uncomplexed ether and the dialkylberyllium product are distilled over step-wise at successively lower subatmospheric pressures.

In a preferred embodiment, tertiary butyl magnesium chloride is reacted with anhydrous beryllium chloride in diethyl ether as the solvent. A high-boiling hydrocarbon chaser is added to the reaction product, the bulk of the ether is distilled out of the reaction mixture at atmospheric pressure, the residual ether is removed under reduced pressure, the pressure being reduced, during the operation, in a continuous manner from atmospheric to about 6 millimeters, and the di-tert-butyl beryllium etherate is separated by distillation at a reduced pressure of about 2 to 5 millimeters. The residual solids, suspended in the chaser, are then separately discharged from the still.

The novel process of this invention exhibits a number of important advantages over the process hitherto used. First and foremost is that this process provides a clean separation of the dialkylberyllium product from the by-products of and reaction medium used in its synthesis. Another very significant feature of this invention is that in almost all cases the presence of the high-boiling chaser results in essentially quantitative in situ dissociation of the dialkylberyllium etherate during the reduced pressure distillation. This in turn enables the removal of the liberated ether through distillation prior to isolation of the ether-free dialkylberyllium product via distillation at still lower pressures. Di-tert-butyl beryllium and di-neopentyl beryllium generally form exceedingly stable etherate complexes and thus the utilization of the chaser technique of this invention enables the clean-cut separation and isolation of these particular beryllium alkyls in the form of their etherate complexes. Other advantages are simplicity of manipulation, improved recovery, and high quality of the product as indicated, for example, by the fact that pyrolysis of the di-tert-butyl beryllium diethyl etherate isolated pursuant to this invention yields beryllium hydride of a purity in excess of 95 percent. Still another advantage is that the high-boiling chaser acts as a suspension agent for the residue in the reactor and thus greatly facilitates cleaning the equipment.

The invention will be more fully understood by reference to the following illustrative examples in which all parts and percentages are by weight.

EXAMPLE I

To a heel of unreacted Grignard reagent from a previous run in a reactor provided with a stirrer, 11,000 parts of anhydrous diethyl ether and 627 parts of magnesium chips were added. The stirrer was set in motion and 240 parts of tert-butyl chloride were added. The contents of the reactor refluxed, owing to evolved heat of reaction, and 2,160 parts of tert-butyl chloride were added in small portions over a 4-hour period. When the formation of the Grignard reagent was complete, the reactor was allowed to cool.

To a pot containing 872 parts of anhydrous beryllium chloride, 4,000 parts of anhydrous diethyl ether were added. The beryllium chloride dissolved with the evolution of a considerable amount of heat; the contents of the pot were allowed to reflux for 1½ to 2 hours at super-atmospheric pressure and 40°–50°C.

The Grignard reagent was transferred to a pressure reactor and heated to a temperature of 35°C. The beryllium chloride solution was added very rapidly (within a period of about 20 seconds) to the Grignard material. The mixture was then stirred for a period of about 2 hours at a temperature of 40° to 46°C. and under a pressure of about 12 to 15 pounds gauge.

When the reaction was complete, the reaction mixture was transferred in toto to a distillation unit. About 6,000 parts of a high-boiling hydrocarbon oil (boiling range: 281° to 392°C.) were added and the bulk of the ether was distilled off over a period of 2 hours at a pot temperature of 58° to 65°C. The pressure was then reduced gradually to about 6 millimeters of mercury for removal of the residual ether, which was collected in dry ice and liquid-nitrogen traps. The pressure was then further reduced to about 2 to 5 millimeters and the pot temperature raised to 79° to 88°C., when the tert-butyl beryllium etherate distilled over at an overhead temperature of 64° to 68°C. A yield of 1,930 parts (90 percent) of tert-butyl beryllium etherate was obtained.

When the procedure of Example I is repeated using tetrahydrofuran instead of diethyl ether, carrying out the distillation of the bulk of the ether at 350 millimeters of mercury pressure instead of at atmospheric pressure, removing the residual ether under reduced pressure of 4 to 150 millimeters and distilling the product under a reduced pressure of 2 to 3 millimeters, similar results are obtained.

EXAMPLE II

Isopropyl magnesium bromide is prepared from 300 parts of magnesium chips and 1,230 parts of isopropyl bromide in 5,300 parts of diethyl ether. Anhydrous beryllium bromide (881 parts) is dissolved with heating in 3,000 parts of diethyl ether.

The Grignard reagent is reacted in a pressure autoclave with the beryllium bromide solution in the manner indicated (for the chloride) in Example I.

When the reaction is complete, the entire reaction mixture is transferred to a still and 4,000 parts of a high-boiling hydrocarbon oil, boiling range: 281°–392°C., are added. The bulk of the ether is distilled off under atmospheric pressure and the residual ether at a progressively reduced pressure of from 760 to 6 millimeters of mercury, the ether being collected in a liquid nitrogen trap. The pressure is then reduced to 2 to 3 millimeters and the pot temperature is raised to 105°C., whereupon diisopropyl beryllium is collected at an overhead temperature of 90°–93°C. The yield is 240 parts (50 percent).

As indicated above, the separation process of this invention is applied to the products of the reaction of an alkyl magnesium halide with a beryllium halide. The beryllium halide employed may be beryllium chloride, beryllium bromide or beryllium iodide. The alkyl halide from which the Grignard reagent is prepared preferably contains from three to eight carbon atoms. Examples of suitable alkyl halides are n-propyl chloride, n-butyl bromide, isobutyl iodide, sec-butyl bromide, tert-butyl chloride, isoamyl iodide, tert-amyl bromide, neopentyl chloride, n-hexyl chloride, n-heptyl bromide, and iso-octyl iodide.

Suitable solvents for the reaction are aliphatic, alicyclic or heterocyclic ethers containing up to 4 carbon atoms in each alkyl group or up to six carbon atoms in each ring. Examples of these compounds include methylethyl ether, di-n-propyl ether, diisopropyl ether, methylpropyl ether, ethylisopropyl ether, diisobutyl ether, di-n-butyl ether, ethylene glycol dimethyl ether, ethylene glycol diethyl ether, diethylene glycol dimethyl ether, diethylene glycol diethyl ether, dicyclopentyl ether, dicyclohexyl ether, bis(methylcyclopentyl)ether, bis(ethylcyclohexyl)ether, dioxolane, 1,3-dioxane, 1,4-dioxane, furan, tetrahydropyran and alkyl substitution products thereof, in addition to the ethers disclosed above.

The chaser may be any high-boiling liquid which is inert with respect to reactants and products. A high-boiling aliphatic hydrocarbon is preferred because of its ready availability, cheapness and stability with respect to the reactants and products. Suitably the chaser has an initial boiling point in the range of 250° to 350°C. and a final boiling point in the range of 350° to 450°C.

The chaser of choice has a composition corresponding to that of a purified light mineral oil. For the sake of chemical inertness, it should, preferably, be low in unsaturated and aromatic compounds, particularly the former. For obvious reasons, it should have a boiling point above that of the beryllium alkyl or etherate to be recovered, and it should not form an azeotrope with the ether.

Among the chasers tested was a refined kerosene, having a boiling range of 205° to 258°C. This performed satisfactorily except that, because of its content of low-boiling components, some of these distilled over with the etherate. This is not a disadvantage where, as in the pyrolysis of the alkyl beryllium etherate product, the chaser can be used as solvent for a subsequent step.

A preferred chaser was a purified light mineral oil having a boiling range of 281° to 392°C. This performed with complete satisfaction and did not distill over in significant quantity with the product to be separated.

A number of hydrocarbon chasers having initial boiling points in excess of 300°C. were tested with satisfactory results.

A considerable range of pressures is available for the various distillations involved in the separation process of the invention. The initial removal of the uncomplexed ether solvent can take place at atmospheric pressure or at a reduced pressure ranging from slightly less than atmospheric to 150 millimeters of mercury or even less. Where the ether boils at a sufficiently low temperature, atmospheric pressure is preferred because of the ease of manipulation connected with its use. The residual uncomplexed ether may be removed under pressures ranging from atmospheric to 5 to 10 millimeters of mercury or even less, depending upon the particular ether in use and upon the particular dialkylberyllium or dialkylberyllium etherate which it is desired to isolate. The dialkylberyllium compound is preferably separated at a pressure of 2 to 5 millimeters of mercury, but an even smaller pressure may be employed if required by the nature of the complexed ether or of the alkyl groups attached to the beryllium.

The dialkylberyllium product of the process of this invention is useful in the chemical and allied arts. For instance, it is, as indicated above, a useful raw material for the preparation of beryllium hydride which, in turn, can undergo alkylation or chain-growth reactions with various olefins to produce beryllium alkyls of various chain lengths. Furthermore, beryllium alkyl etherate is a convenient source, via pyrolysis, of highly pure beryllium metal. Beryllium alkyls produced by the process of the invention are effective polymerization catalysts. (See, for example, Ziegler, British Pat. No. 713,081.)

Having thus described the novel process of the invention, it is not intended to be limited except as set forth in the following claims.

I claim:

1. In the process for preparing a dialkylberyllium compound which comprises reacting an anhydrous beryllium halide wherein the halogen has an atomic number of from 17 to 53, inclusive, with an alkyl magnesium halide wherein the halogen has an atomic number of from 17 to 53, inclusive, and wherein the alkyl group contains from three to eight carbon atoms, in a solvent comprising an ether selected from the group consisting of aliphatic, alicyclic and heterocyclic ethers containing up to six carbon atoms in each hydrocarbon group, and separating the dialkylberyllium product from the crude reaction product, the improvement which comprises carrying out the separation step by diluting said reaction product with a hydrocarbon chaser having an initial boiling point in the range of 250° to 300°C. and a final boiling point in the range of 350° to 450°C., distilling off essentially all of the uncomplexed ether, and then distilling the dialkylberyllium product under reduced pressure, the quantity of said hydrocarbon chaser being sufficient to maintain in suspension the solid residue from the distillation of the said dialkylberyllium product.

2. The process of claim 1 wherein the alkyl magnesium halide is an alkyl magnesium chloride and the anhydrous beryllium halide is anhydrous beryllium chloride.

3. The process of claim 1 wherein the alkyl magnesium halide is a tert-alkyl magnesium halide.

4. The process of claim 1 wherein the alkyl magnesium halide is a tert-butyl magnesium halide.

5. The process of claim 1 wherein the alkyl magnesium halide is tert-butyl magnesium chloride.

6. The process of claim 1 wherein the ether is an aliphatic ether.

7. The process of claim 1 wherein the ether is diethyl ether.

8. The process of claim 1 wherein the ether is an alicyclic ether.

9. The process of claim 1 wherein the ether is a heterocyclic ether.

10. The process of claim 1 wherein the bulk of the uncomplexed ether is removed at atmospheric pressure and the residual uncomplexed ether is removed under reduced pressure.

11. The process of claim 1 wherein the bulk of the uncomplexed ether is removed at atmospheric pressure, the residual uncomplexed ether is removed under reduced pressure and the dialkylberyllium compound is separated from the reaction by-products and the hydrocarbon chaser under a reduced pressure lower than that under which the residual uncomplexed ether is removed.

* * * * *